July 11, 1950     D. A. MARRA     2,514,777

TIP FOR CUTTING TORCHES

Filed July 25, 1947

Inventor
Daniel A. Marra
by Christy, Parmelee &
Strickland
his Attorneys

Patented July 11, 1950

2,514,777

UNITED STATES PATENT OFFICE 2,514,777

TIP FOR CUTTING TORCHES

Daniel A. Marra, Cheswick, Pa.

Application July 25, 1947, Serial No. 763,520

8 Claims. (Cl. 158—27.4)

This invention relates to torch tips, and particularly to the tips for cutting torches, and consists in certain new and useful improvements in the multiple-part structure and in the particular combination of materials for the component members thereof.

Figure 3:
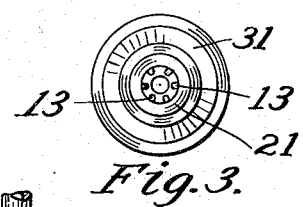
Figure 2:
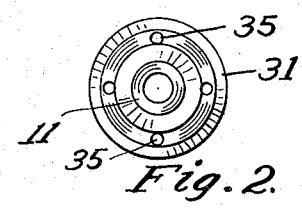
Fig. 2 is a view to larger scale of the rear or inlet end of the tip in elevation.
Figure 5:
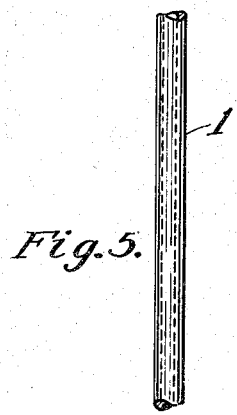
Figure 6:
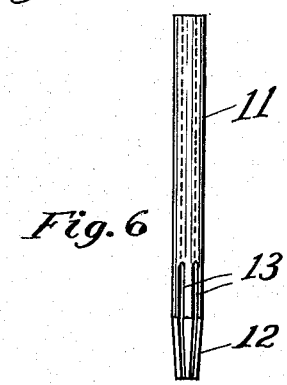
Figure 1:
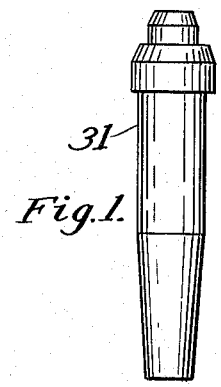
Fig. 1 is a view in side elevation of a cutting-torch tip embodying my invention.
Figure 7:
Figure 8:
Figure 11:
Figure 9:
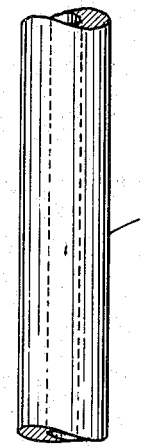
Figure 10:
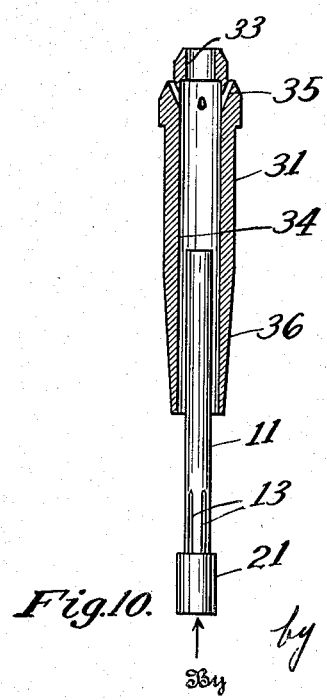
Figure 4:
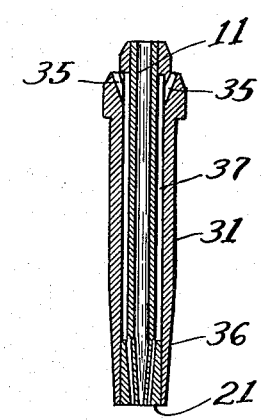

Fig. 3 a view of the front or delivery end of the tip in elevation, on the same scale as Fig. 2;

Fig. 4 is a view of the tip in longitudinal and axial section;

Fig. 5 is a fragmentary view in side elevation of the stock from which one component of the outer tip member is shaped;

Fig. 6 is a view in side elevation of the inner tip member, ready for assembly;

Fig. 7 is a fragmentary view in side elevation of the stock from which one component of the outer tip member is shaped;

Fig. 8 is a view in longitudinal axial section of the tip component that is shaped from the stock shown in Fig. 7;

Fig. 9 is a view in side elevation of the stock from which another component of the outer tip member is formed;

Fig. 10 is a view partly in axial section and partly in side elevation, illustrating the progressive assembly, first, of the inner member with the inner component of the outer member, and, second, the assembly of the united parts last named with the outer component of the outer member;

Fig. 11 is a view comparable with Fig. 8 illustrating a modification of the inner component of the outer tip member.

A cutting tip is essentially a tubular article in whose walls additional passageways are formed. At the delivery end the central orifice is surrounded by a ring of orifices through which the passageways formed in the walls emerge. When the tip is assembled and in service, heating flames spring from the ring of orifices, and, at proper time, a jet of cutting oxygen is delivered from the central orifice.

It is entirely possible to form such a tip of an integral blank (ordinarily of copper), and to drill through the solid metal all of the passageways within the walls. But the expense involved is such, the slowness of production, and the difficulty of producing accurate work, that the prevalent way of producing cutting tips is to form them of two tubular parts telescoped together. It is usual to form the inner part of brass, to sink into its outer surface suitable grooves, and to telescope upon the machined inner part an outer sleeve of copper. This outer sleeve, overlying the grooves, completes the desired passageways.

Under the extreme temperatures and rough usage to which torch tips are subjected in service, the tips in common use heretofore last only a relatively short time, and the problem has always been to provide a more enduring structure, without increasing the cost of production to prohibitive degree.

My solution of the problem consists in forming the terminal and inner tip portions of a highly refractory and conductive metal. More particularly, I have discovered that by forming these tip portions of such a metal, the outer tip member or sleeve may be formed of a material which is less refractory and conductive, such a relatively inexpensive material as malleable cast iron or a high chrome-nickel cast steel. The so-constituted structure provides a successful and superior tip; and the quantity of copper required in the tip is much less than the quantity that goes into the typical brass-copper tip. Indeed, in some cases the use of copper or cuprous metals may be eliminated.

A cuprous metal may be used for the inner tip member and the metal may be relatively pure copper, or it may be Monel metal, an alloy whose copper component approximates 35%. I have found that a cuprous metal of the types mentioned has certain physical properties compatible to those of malleable cast iron under the conditions of service to which the tip is exposed. The so-composed tip admits of ready fabrication and assembly, and the component parts mutually co-operate in affording integrity and durability of tip structure under high temperature.

Referring to the drawings, the tip of my invention comprises three members: first, an outer tip member 31; second, an inner tip member 11; and, third, an intermediate tip member 21. The first or outer tube member is formed of tubular stock of malleable cast-iron, as indicated at 3, Fig. 9. It is cut to length, counter-bored as indicated at 34, Fig. 10, machined to the exterior form required for seating in the head of a torch, and provided with drilled passageways 35, through which, when the tip is seated, a gaseous mixture, or the components of a desired gaseous mixture, may flow from suitable passageways in the torch head to the counter-bored space 34. At the delivery end the stock will ordinarily be tapered, as indicated at 36, and thus the outer member 31 is completed. At the basal end the bore 33 in the outer member 31 corresponds to the outer diameter of the second or inner member 11, and the counterbore 34 corresponds to the outer diameter of the third or intermediate member 21.

Heretofore, it has been customary to form the inner tip member of a brass or copper tube having an excessive wall thickness, and then to machine the tube externally throughout the greater portion of its extent to a reduced diameter, in order to provide, when the machined tube is assembled in the outer tip member, a chamber between the inner and outer members, from which chamber passageways lead to the delivery end of the tip. As distinguished from such practice, I form the second or inner tip member 11 of a tube 1 of copper or Monel metal. The forming involves accurate cutting to length, attenuation at the end that is to become the delivery end 12 (with corresponding chocking of the bore, as shown in Fig. 4), and the sinking of grooves 13 in the surface at the attenuated end.

The third or intermediate tip member 21 is a short essentially tubular member formed of copper or Monel metal, telescoped upon the grooved end of the inner member 11. The member 21 is effective by overlying the grooves 13 to convert the grooves into passageways, and is effective by virtue of its short extent into the bore of the outer tip member to permit the space between the inner and outer tip members to form a relatively long gas chamber 37, Fig. 4. In Fig. 7 tubular stock 2 of copper or Monel metal is illustrated, and from such stock the third or intermediate member 21 (Fig. 8) of the tip is formed by cutting and shaping. The bore of this third member is formed with a taper 24 that corresponds to the taper of the delivery end 12 of the inner member 11. The member 21 is applied to the delivery end of the member 11 and is telescoped upon it in a snug, hermetically tight, and physically secure union (cf. Figs. 10 and 4).

Assembly is effected in the manner illustrated in Fig. 10. The member 11, with which the member 21 has already been united, is introduced into the member 31 through the counter-bored delivery end, and the parts are telescoped to the assembled positions shown in Fig. 4. The telescopic unions at the basal and delivery ends are snug, hermetically tight, and physically secure. In the mid-portion of their extent the members 11 and 31 stand apart to form the chamber 37 that is closed rearwardly by the shoulder at the base of the counterbore 34 and forwardly by the member 21. Through the passageways 35 the gases have access to the chamber 37, and from the chamber 37 the gases advance through the passageways formed by the grooves 13 to the delivery orifices.

The completed tip may be of normal shape and proportions and may serve in normal manner. Being seated in the head of a torch, a combustible gaseous mixture delivered through the passageways formed by the grooves 13 may burn at the delivery end in a circle of jets called the heating flame. This flame may be caused to play upon the work until the work is brought to the desired high temperature. Cutting oxygen then, delivered through the bore of member 11 and playing upon the hot work produces localized combustion of the substance of the work, and such combustion progresses, with progressing localized heating, to effect the burning away of material that is called cutting.

Monel metal or copper may readily be worked in the manner and to the ends described; it is of such high melting-point, such refractoriness, and such resistance to corrosion, as to render it a suitable material for cutting-torch tips.

Malleable cast iron could by no means be so used, for if the tip were formed wholly of malleable cast iron, it would in service burn rapidly away and be destroyed. However, as already mentioned, I have discovered that if the inner tip member be formed of another and less combustible metal, specifically a cuprous metal, and if, additionally, the third member 21 be provided (formed also of such less combustible material), then the outer member 31 (which then becomes really a case or shell) may successfully be formed of malleable cast iron. The heat generated in the operation of a torch is exerted most intensely upon the delivery end of the tip at the very centre, and from that point diminishes outwardly in intensity; and I have found by actual experience that in the tip here shown and described the outer member 31 is at the delivery end so far remote from the centre of heat intensity that it is not brought to the temperature of combustion and destruction. Malleable cast iron is a material that, being shaped to form the outer tip member 31, and being hardened, retains its hardness, unimpaired within the temperature range of service. And, in the matter of hardness, an outer tip member formed of malleable cast iron is far superior to such a member formed of copper (as is usual) for it will endure the rough usage of service, and will not become nicked and misshapen as a copper member does, and it will not melt, as copper under severe usage is apt to do. Malleable cast iron as a material for the outer tip member 31 is, even in normal times, far cheaper than copper.

The parts 11 and 21 of the tip will not suffer serious distortion in making assembly with the malleable cast iron member 31; and, in the matter of thermal expansion, the coefficients of the two parts are so nearly identical that the assembled structure continues secure and tight through all the range of temperature incident to service.

It will be observed that in adapting a heat-resistant ferrous metal to use in forming the greater portion of a blowpipe tip, minimum departure has been made from conventional tip construction. It has not been, by virtue of the discovery of my invention, necessary to fortify or enlarge the body of the tip at its outlet end, nor to interrupt the extent of the ferrous body portion of the tip at a substantial interval from the outlet end of the tip.

The multiple-part tip structure designed to provide for the effective use of a ferrous metal in the major portion of the tip body admits of the advantageous use of other materials not heretofore used in tips in the combination now to be considered.

The central and intermediate tip members 11 and 21 may be formed of a highly refractory sintered or cemented carbide, such as a carbide of tungsten, tantalum, titanium, silicon, zirconium, beryllium, thorium, vanadium, chromium, molybdenum, uranium, boron, as well as the alloys and mixtures of such elements with each other and with iron. The particular method of fashioning and forming the parts and whether the material be known as cemented carbide or sintered carbide are matters well understood in the metallurgical art, and need not be further dwelt upon in this specification directed to the torch tip art. Suffice it to say that in the appended claims where I use the word "carbide," I intend to include the hard metallic composition of the class mentioned, whatever may be the specific composition or the method of its production.

The body of the central tip member need not be entirely formed of such metal. For example, the grooved delivery end portion only of member II may be formed of the sintered carbide and the remainder of the body of such member may be formed of another and less costly metal, the two portions being welded or otherwise integrated end to end in a hermetic union. The tip thus constructed with its members II and 2I comprised of a sintered carbide is serviceable for many times the life of tips as constructed heretofore.

In refinement, the intermediate tip member 2I may be provided with an outwardly extending flange or peripheral shoulder 2Ia, Fig. 11, which snugly fits upon and overlies the edge of the outer member or sleeve 3I at the delivery end of the tip, thus affording protection and greater durability. By virtue of the described use of a sintered carbide in the inner and intermediate tip members, it becomes possible and practical to form the outer tip member of aluminum or magnesium, or other light and relatively soft or vulnerable material.

This application is a continuation-in-part of an application Serial No. 526,553, filed by me March 15, 1944, now abandoned.

Within the scope of the appended claims various modifications and variations may be made without departing from the spirit of the invention.

I claim:

1. A torch tip comprising an elongate inner member of tubular form whose body at the delivery end of the tip is formed of a highly refractory metal and is externally formed with a plurality of grooves extending in longitudinal direction, an intermediate member less in length than the inner member and in the assembly overlying the grooved portion of the inner member and forming with the grooves gas passageways, and an outer tubular member, formed of less refractory material, telescopically assembled with said inner and intermediate members and forming with them a gas chamber from which said gas passageways lead.

2. The structure of claim 1, wherein the intermediate member is also formed of a highly refractory metal.

3. The structure of claim 2, wherein the intermediate member includes a peripheral shoulder overlying the edge of said outer tubular member at the delivery end of the tip.

4. The structure of claim 1, wherein the intermediate member includes a peripheral shoulder overlying the edge of said outer tubular member at the delivery end of the tip.

5. The structure of claim 1, wherein the body of said central member at its delivery end comprises sintered carbide.

6. The structure of claim 1, wherein the body of said intermediate member comprises sintered carbide.

7. A tip for a cutting torch comprising an elongate inner member of Monel metal of essentially tubular form externally formed with a plurality of grooves adjacent its delivery end, an intermediate member less in length than the inner member and in the assembly overlying the grooved portion of the inner member and forming with the grooves gas passageways, and an outer member of malleable cast iron of essentially tubular form, counter-bored from the delivery end toward the opposite end and in the assembly enveloping both the inner and the intermediate members and forming with them a gas chamber from which the said gas passageways lead.

8. The tip of claim 7, wherein the intermediate member is also formed of Monel metal.

DANIEL A. MARRA.

REFERENCES CITED

The following references are of record in the file of this patent:

UNITED STATES PATENTS

| Number | Name | Date |
| --- | --- | --- |
| 1,194,769 | Neagley | Aug. 15, 1916 |
| 1,481,800 | Harris | Jan. 29, 1924 |
| 1,483,467 | Meden | Feb. 12, 1924 |
| 1,762,166 | Fauset et al. | June 10, 1930 |

FOREIGN PATENTS

| Number | Country | Date |
| --- | --- | --- |
| 653,831 | Germany | Dec. 3, 1937 |